United States Patent
Ross et al.

(10) Patent No.: US 11,470,769 B2
(45) Date of Patent: Oct. 18, 2022

(54) SCREENING BELT UNIT FOR A HARVESTING MACHINE, AND ASSOCIATED FLAP UNIT

(71) Applicant: Grimme Landmaschinenfabrik GmbH & Co. KG, Damme (DE)

(72) Inventors: Julian Ross, Eslohe (DE); Josef Gerdes, Loningen (DE); Heinrich Hönemann, Osnabrück (DE); Christoph Halbrügge, Wallenhorst (DE)

(73) Assignee: Grimme Landmaschinenfabrik GmbH & Co. KG

( * ) Notice: Subject to any disclaimer, the term of this patent is extended or adjusted under 35 U.S.C. 154(b) by 0 days.

(21) Appl. No.: 16/755,696

(22) PCT Filed: Oct. 16, 2018

(86) PCT No.: PCT/EP2018/078301
§ 371 (c)(1),
(2) Date: Apr. 13, 2020

(87) PCT Pub. No.: WO2019/076932
PCT Pub. Date: Apr. 25, 2019

(65) Prior Publication Data
US 2021/0185904 A1    Jun. 24, 2021

(30) Foreign Application Priority Data
Oct. 17, 2017    (DE) .................. 102017124170A1

(51) Int. Cl.
*A01D 17/10* (2006.01)
*A01D 33/00* (2006.01)
(Continued)

(52) U.S. Cl.
CPC ............. *A01D 17/10* (2013.01); *A01D 33/00* (2013.01); *B07B 1/10* (2013.01); *B65G 15/52* (2013.01);
(Continued)

(58) Field of Classification Search
CPC .. A01D 17/10; A01D 33/00; A01D 2017/103; B07B 1/10; B65G 15/52; B65G 17/063
See application file for complete search history.

(56) References Cited

U.S. PATENT DOCUMENTS

| | | | | |
|---|---|---|---|---|
| 3,061,077 A | * | 10/1962 | Noffsinger | B65G 17/063 |
| | | | | 198/690.2 |
| 3,392,819 A | * | 7/1968 | Waite | B65G 17/063 |
| | | | | 198/852 |

(Continued)

FOREIGN PATENT DOCUMENTS

| | | |
|---|---|---|
| DE | 3234 C | 5/1878 |
| DE | 2520605 A1 | 11/1976 |

(Continued)

*Primary Examiner* — Mark A Deuble
(74) *Attorney, Agent, or Firm* — Husch Blackwell LLP

(57) ABSTRACT

Screening belt unit is provided for a harvesting machine or harvested material transport device, and in particular for a root crop harvester or root crop transport belt, and for screening extraneous material out of a mixture of harvested material and extraneous material. A screening belt has at least two endless carriers, preferably in the form of carrier belts or chains, between which screening bars are arranged in a direction transversely to the conveying direction. The screening bars forming a plurality of screening bar units that comprise in particular in each case at least two screening bars. At least a part of the screening bars is fixed so as to be movable relative to the endless carriers. The screening belt unit has a positioning means which is arranged at least partially along the screening belt and acts on the movable screening bars. In the screening zone S, as seen in the
(Continued)

screening direction, a spacing A in the conveying direction F of successive screening bars is defined and in particular settable in a variable manner, and associated flap unit.

19 Claims, 14 Drawing Sheets

(51) Int. Cl.
  *B07B 1/10* (2006.01)
  *B65G 15/52* (2006.01)
  *B65G 17/06* (2006.01)
(52) U.S. Cl.
  CPC ...... *B65G 17/063* (2013.01); *A01D 2017/103* (2013.01)

(56) References Cited

U.S. PATENT DOCUMENTS

| | | | |
|---|---|---|---|
| 4,787,461 A | 11/1988 | Rogus | |
| 4,892,509 A * | 1/1990 | Jager | A01D 17/10 474/237 |
| 5,697,451 A | 12/1997 | Nicholson | |
| 9,440,793 B2 * | 9/2016 | Matsuzaki | B65G 23/06 |
| 2014/0367230 A1 * | 12/2014 | Jager | B65G 17/063 198/850 |
| 2016/0066501 A1 * | 3/2016 | Altendorf | A01D 17/10 209/2 |
| 2021/0251135 A1 * | 8/2021 | Ross | A01D 17/10 |

FOREIGN PATENT DOCUMENTS

| | | |
|---|---|---|
| DE | 3109209 A1 | 11/1982 |
| DE | 3429004 A1 | 2/1986 |
| DE | 20011436 U1 | 10/2000 |
| DE | 102004045487 A1 | 4/2006 |
| EP | 0133886 A1 | 3/1985 |
| EP | 0312629 A1 | 4/1989 |
| EP | 2813134 A1 | 12/2014 |
| EP | 2813135 A1 | 12/2014 |
| FR | 2216901 A1 | 9/1974 |
| JP | S44017154 | 7/1969 |
| JP | S48039210 | 9/1973 |
| JP | S5438289 U | 3/1979 |
| JP | S52022480 U | 3/1979 |
| JP | S57109590 | 7/1982 |
| JP | 2013252499 A | 12/2013 |
| JP | 2016149947 A | 8/2016 |
| UA | 114168 U | 5/2017 |

* cited by examiner

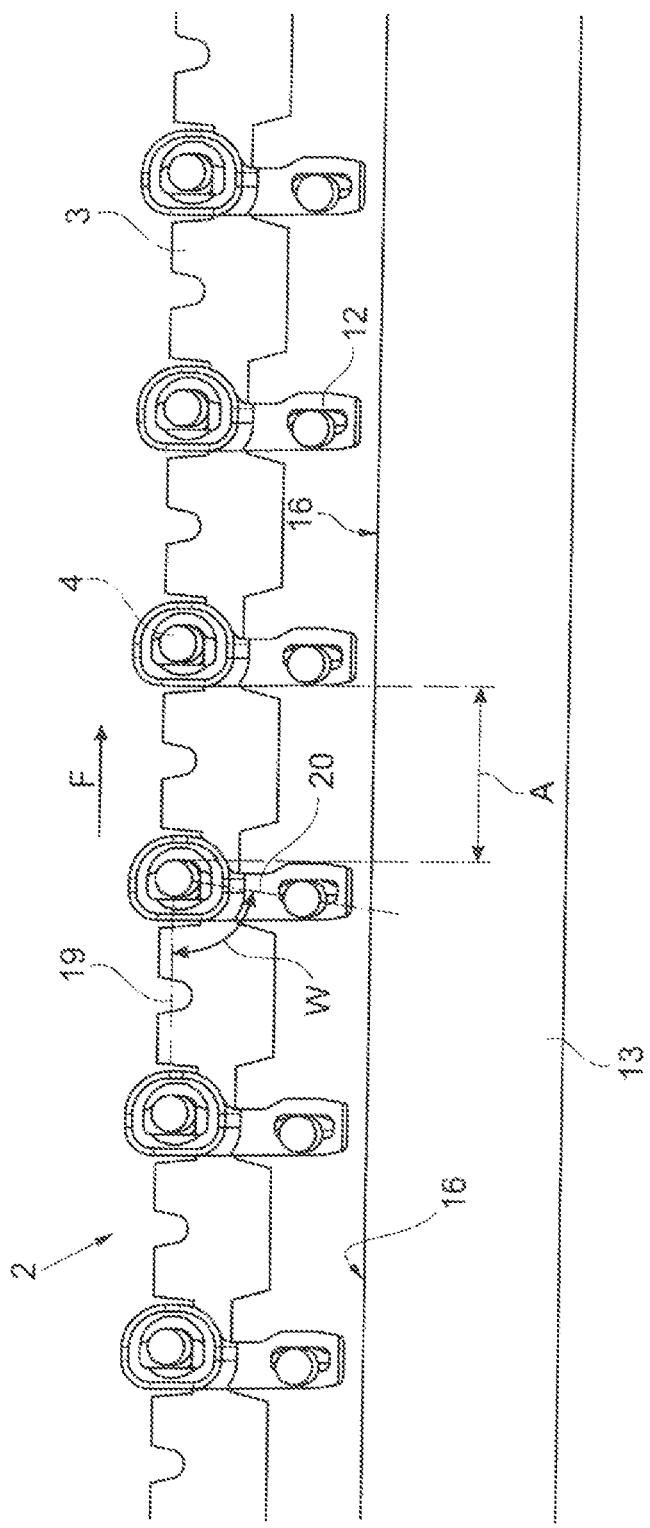

SCREENING BELT UNIT FOR A HARVESTING MACHINE, AND ASSOCIATED FLAP UNIT

CROSS REFERENCE

This application claims priority to PCT Application No. PCT/EP2018/078301, filed Oct. 16, 2018, which itself claims priority to German Application No. 10 2017 124170.1, filed Oct. 17, 2017, the entirety of both of which is hereby incorporated by reference.

FIELD OF THE INVENTION

The present invention relates to a screening belt unit for a harvesting machine, in particular for a root crop harvester, for screening extraneous material out of a mixture comprising harvested material and extraneous material, in particular in the form of soil, clods and stones, wherein the screening belt unit comprises a screening belt, which has at least two endless carriers, preferably in the form of carrier belts or chains, between which screening bars are arranged in a direction transversely to the conveying direction, said screening bars forming a plurality of screening bar units that comprise in particular in each case at least two screening bars, wherein at least a part of the screening bars is fixed so as to be movable relative to the endless carriers.

BACKGROUND

In the harvesting and transporting of root crops, in particular potatoes, using a generic screening belt, undesired extraneous material in the form of earth is deliberately carried along to protect the harvested material, but furthermore likewise removed deliberately from the mixture of harvested material and extraneous material. At the same time, a situation is intended to be avoided whereby, depending on the size of the harvested material to be screened and transported, fractions of harvested material that are too small drop through the screening belt or are squashed during transport.

To this end, DE 27 15 108 proposes varying the screening belt pitch such that additional transverse bars to be attached to the existing screening belts need to be fitted subsequently, said additional transverse bars resulting in a variation in the screening belt pitch. The additional transverse bars need to be fitted individually, this being associated with corresponding effort.

Furthermore, trapdoors are known from the prior art, which are incorporated into a screening belt as additional components. The trapdoors are closed in the screening zone in the upper strand and open under gravity in the lower strand. As a result, relatively large openings arise in the lower strand, which improve the self-cleaning of the screening belt on account of extraneous material dropping down out of the upper strand. The trapdoor is closed in the load strand and opens under gravity only in the return strand. In order to change the screening belt pitch, i.e. the effective spacing of the screening bars of the screening belt, the latter has to be removed and replaced. The associated expenditure of time during harvesting operation, given frequently relatively narrow time frames, is disadvantageous.

SUMMARY OF THE INVENTION

The object of the present invention is to minimize the effort required for changing the screening belt pitch.

According to the invention, the screening belt unit has a positioning means, which is arranged at least partially along the screening belt and acts on the movable screening bars and via which, in the screening zone, as seen in the screening direction, a spacing in the conveying direction of successive screening bars is defined and in particular settable in a variable manner. The positioning means acts either directly or indirectly on the movable screening or transverse bars. This results in a relative position of the movable screening bars with respect to the endless carriers such that, as seen in the screening direction, the spacings of the screening bars (a movably arranged screening bar and an in particular successive fixed screening bar) are varied by a changed position of the positioning means.

As a result of the arrangement of the positioning means, which is not deemed part of the screening belt, and the action thereof on the movable screening bars, the spacing of the successive screening bars can also be varied in the course of one and the same screening zone. For example, for this purpose, the positioning element, as seen in the screening direction, can keep or guide the movable screening bars at a spacing that varies, in particular a spacing that increases and/or decreases, over the course of the screening zone. In this way, over the course of a screening zone, with an increasing conveying path, the separation of the extraneous material from the harvested material can be carried out in a targeted manner. The change in the spacing in the conveying direction of successive screening bars is preferably simultaneously associated with the change in the spacing perpendicular to the conveying direction, resulting in the advantageous formation of pockets in the screening belt.

As a result of the formation according to the invention of a screening belt unit having screening bar units, which preferably each have one or more movably fixed screening bars, it is possible to dispense with replacing the screening belts in order to change the screening belt pitch. Likewise, the attachment, known from the prior art, of additional screening or transverse bars is dispensed with. The screening or transverse bars of the device according to the invention comprise both bars that extend perpendicularly between the two endless carriers and those that can be slightly obliquely angled, and in particular also bent screening bars.

Furthermore, it goes without saying that the endless carriers can be opened via known connecting means in a conventional manner for maintenance and repairs or for replacement on account of becoming worn. For this purpose, the endless carriers can have locks or other connecting regions opening the endless carrier.

Advantageously, at least a part of the screening bar unit is designed to be variable in position relative to the endless carrier by the positioning means. The screening bar unit has in this case in particular the screening bar that is fixed in a movable manner relative to the endless carriers. Accordingly, a part of the screening bar unit is then configured to be variable in position relative to the endless carrier. Preferably, the part of the screening bar unit that is positionable in a variable position with respect to the endless carrier is a flap part, described below, which can be pivoted or rotated about at least one part of the screening bar unit that is arranged in a fixed position relative to the endless carrier or on the latter. In particular, the pivotable or rotatable part of the screening bar unit and thus the movable part thereof is mounted on the positioning element in a manner arranged downstream of the non-pivotable part of the screening bar unit in the direction of travel, this being advantageous for a drawing movement since fewer blockages of the pivotable parts in contact with the positioning means can occur. For nevertheless optionally possible and in particular brief reversing operation of the screening belt for the purpose of resolving any blockages, the pivotable or rotatable part can then also be mounted in a leading manner.

According to a further embodiment of the invention, the screening bar unit may have a screening bar that is mounted eccentrically in cross section. This can be an oval bar or a bar that is round but provided with an axis of rotation provided eccentrically within its outer surface. When these round bars are used, in order to vary the spacing of successive bars, not every bar but for example only every second bar is adjusted. Preferably, however, the screening bar is one that is mounted so as to be rotatable or pivotable about a pivot axis and is spaced apart from an axis of rotation or pivot axis via a joint and any associated spacing means. It is thus possible according to the invention to use screening bars that are already known.

In particular, the screening bar unit is provided with at least one flap unit, which has at least one of the two screening bars, wherein the flap unit is pivotable or rotatable via at least one joint connected to the endless carrier, and the positioning means is configured to influence an angular position of the flap unit. The flap unit thus has the screening bar to be pivoted. The angular position arises via an angle between the conveying direction and a longitudinal extent, proceeding in a radial direction from the axis of rotation or pivot axis, of the flap unit. For example, this longitudinal extent is defined, in the case of a screening bar unit having a screening bar fastened to the endless carrier and a screening bar arranged in a pivotable or rotatable manner with respect thereto, by a straight section that extends through the two longitudinal centre axes of the screening bars and perpendicularly to the same screening bars and is angled with respect to the conveying direction F.

Flap units according to the invention can be arranged successively in the conveying direction of the screening belt, such that the positioning means, which is arranged at least partially along the screening belt and in particular in the screening zone, simultaneously influences a plurality of flap units in terms of the angular positions thereof. As a result of different angular positions on account of different positions of the positioning means, a respectively different spacing arises, as seen in the screening direction, between the fixedly spaced-apart screening bars of a screening bar unit and between the screening bars of a first upstream and a downstream screening bar unit.

The screening direction is in this case the direction of the force of gravity, which acts on the extraneous material such that the latter can drop through between the interspaces formed by the screening bars, provided that the dimensions are correct.

According to a development according to the invention, the positioning means is configured such that it limits the in particular gravity-related pivoting or rotation of the flap units. It is thus located beneath the movable parts of the screening bar unit or of the flap unit and forms a support or a support surface therefor. Thus, an angular position can be defined by the resting of the movable parts of a screening bar unit, said angular position being associated with a particular screening belt pitch. If the positioning means is spaced apart to a sufficiently great extent from the screening bar unit such that the latter is no longer in contact with the positioning means, the screening bar unit is then oriented by gravity. In this position, the spacing in the conveying direction of successive screening bars, i.e. screening bars that follow one another, the pitch would be at a maximum at least in the case of a screening zone extending horizontally with respect to the underlying surface (and with any asymmetries in the weight distribution of a flap unit not being taken into account). In the case of an arrangement of the positioning means extending as closely as possible along the endless carrier, the screening unit can be pivoted only slightly, if at all, and has a horizontal or virtually horizontal orientation extending parallel to the conveying direction F. The screening bar spacings are then at a minimum.

Advantageously, the positioning means has, in the screening zone, at least one guide surface for the flap units to rest on. Such a guide surface, which extends along the screening belt as per the arrangement of the positioning means, provides a structurally relatively simple possibility of influencing a large number of screening bar units at the same time. As a result of such a guide surface and thus the positioning means being moved towards and away from the screening belt, freedom of movement is defined for the pivotable or rotatable flap units, this freedom of movement resulting in the determination of the arrangement angle of the flap units and thus the screening belt pitch. Advantageously, as seen perpendicularly to the conveying direction, the guide surface is arranged next to and in particular at least partially between the endless carriers. It is then possible for conventional screening belts to be used without changing the installation space width for the screening belt, wherein the positioning means is arranged along the screening zone merely on the inside in the often present air spaces of the screening belt frame, and is fixed preferably in a variably positionable manner on the machine frame or screening belt frame. In this way, already existing harvesting machines can thus be retrofitted with the screening belt unit according to the invention.

In a further advantageous development of the screening belt unit, the guide surface, as seen in the conveying direction, is angled with respect to an underlying surface, preferably at an angle $\gamma$ of between 10° and 60°, and is configured in a manner dropping in particular towards the middle of the screening belt unit. As a result, less undesired extraneous material in the form of earth or clods can be deposited on the guide surface. In particular, guide surfaces that drop towards a middle of the screening belt unit are located at a height of the screening belt on both sides along said middle, such that the guided screening bar units are centred and at the same time as little extraneous material as possible is deposited on the guide surfaces.

Preferably, the guide surface, in order to create a selectively variable spacing, i.e. a selectively variable screening belt pitch, may be provided with a profiling, which can be present partially or on the entire guide surface of the positioning element for short pulses, for example, for supporting cleaning purposes. As a result of a profiling, it is possible, during operation, for the spacing of the screening bars or the angular position of the flap units to be influenced, this in turn resulting in brief, pulse-like raising or lowering of the transported mixture. As a result of a shaking movement induced in such a way, a cleaning action can be supported easily.

It goes without saying that the screening bars can be provided, in particular—but not only—for protecting the harvested material, with a plastics coating, which has damping properties. It is also possible for a plurality of screening bars of a flap unit or screening bar unit to be provided with one and the same covering, such that the spacings of the screening bars of a screening bar unit are reduced to zero.

In particular, the guide surface is part of a guide rail that is configured at least partially as a wearing part. A part of the screening belt unit that is fastened for example as a guide rail to the machine frame thus has in particular an exchangeable part in the form of one or more sliding rails. Said part is fastened via correspondingly releasable fastening means to the further screening belt unit or to the machine frame or simply to the further guide rail. In particular, the guide rail is provided with a plastics layer, for example made of polyurethane, or is even formed entirely from plastic.

Generally, a screening bar is understood to be a bar of any cross section that is spanned between the endless carriers. The cross section can be formed in a round, non-round and in particular also flat manner.

In order to variably set or realize settability even during ongoing operation or during brief retrofitting phases, according to a further configuration according to the invention, the positioning means can be assigned at least one adjusting member, via which the spacing of at least one part, guiding the flap unit, of the positioning means with respect to the endless carrier is settable. In particular, in this way, at least the spacing of the guide surface with respect to the endless carrier is varied. This spacing then results in the angular position of the flap unit connected to the endless carrier, wherein the positioning means can rest on one or more parts of the flap unit, in particular comprising a joint part and/or a screening bar. Suitable adjusting members are preferably threaded bars for in particular manual adjustment or adjustment controlled via stepper motors. Alternatively or in addition, hydraulically or pneumatically or generally electromotively operated adjusting members can be used. These are actuable in particular via a control device or control and evaluation device that belongs to the machine controller and in particular is integrated therein.

By way of one or more adjusting members, which actuate positioning means that act in particular only on short portions of the screening belt, at least on one screening bar unit, knocking that supports screening can be generated by means of an associated control device or control and evaluation device.

Preferably, a positioning means is arranged both at the left-hand end and at the right-hand end of the respective screening bar units, as seen in the conveying direction, such that uniform guidance of the movable screening bars is realized. Regardless of a partially integral connection, possibly present at the frame, of the positioning means to a guide of the respective endless carrier, a part of the positioning means that effects guidance of the screening bar units is arranged in a manner spaced apart from the endless carrier.

The positioning means may be configured advantageously in a multipart manner along the screening zone, such that there is as much variability as possible in the spacing apart in particular of the guide surface from the endless carrier. The guide surface can then likewise be configured in a multipart manner and execute changes in the pitch of the screening belt.

For example, a screening belt unit according to the invention that is provided with flap units can furthermore be used in a rising region of the screening belt by setting a particular angular position of the flap units in order to form conveying pockets in the screening belt, while, in the case of conveying portions extending more horizontally, the emphasis can be placed on the screening function. For this purpose, in the screening belt region having primarily a screening function, other, and in particular also varying, spacings of the guide surface from the endless carrier and thus associated different angular positions of the flap units and screening bar distances can be set. A screening belt unit according to the invention can thus have different key functions over the course of its screening zone in the upper strand.

In this regard, in the case of a multipart positioning means, the screening belt unit according to the invention then also has in particular a plurality of adjusting means. While the screening bar units according to the invention can have slight changes, brought about for example via slots, in the spacings of the screening bars from one another, it is advantageous, in order to avoid undesired positions and to define precise spacings, for the screening bars of a screening bar unit to have a fixed spacing from one another, apart from any play there may be.

According to a further advantageous configuration of the invention, a screening bar of each screening bar unit is fixed to the endless carriers and forms a part of two joints for attaching the flap unit. As a result of the fixing of the screening bar, a pivot joint or rotary joint can be formed in a simple manner, which allows, via the pivotable or rotatable joint parts, a movable screening bar arranged parallel to the fixed screening bar. Appropriately, the screening bar unit has, towards both external endless carriers, a rotary or pivot joint. The screening bar fixed to the endless carrier then forms the axis of rotation of the flap unit. Alternatively, it is possible for, for example, two screening bars that pivotably form the flap unit to be mounted on one another and, via a bent connection that does not form a screening bar, in a pivot bearing or rotary bearing of the respective endless carriers.

In particular, the guide surface is part of a guide rail, which, as a structurally relatively simple component, can be mounted and in particular retrofitted on a frame of the screening belt or a machine frame by installation of a screening belt unit according to the invention in a harvesting machine.

In order to minimize wear between the pivotable screening bar unit part and the guide surface, the positioning means can also be configured at least partially in a concurrently running manner. In such a structurally more complicated case, the speed of revolution of the positioning means, which can also be configured for example in a belt-like manner, would be adapted to the speed of revolution of the screening belt. The positioning means would then likewise be configured again with a variable spacing from the screening belt via corresponding positioning means.

Preferably, at least 25% of the screening bars are configured to be variable in position relative to the endless carrier, such that a screening belt has a variable screening pitch along large parts of its total length. More preferably, a screening belt unit according to the invention is furthermore provided with a screening belt that is provided at least to an extent of 50% with screening bars formed in a variable position with respect to the endless carrier. In this way, it is possible for example for every second screening bar to be formed in a stationary manner, while a flap unit is arranged on each stationary screening bar with a screening bar that is at a fixed spacing but is movable in a pivotable manner about the stationary screening bar. Configurations according to the invention of the screening belt unit can preferably design up to 3 out of 4, i.e. 75%, of the screening bars so as to be variable in position, such that advantageous configurations of the flap unit with two screening bars that are pivotable about a stationary screening bar or with three pivotable screening bars can be used.

The preferred embodiments of the invention are provided with flap units that are at least to a certain extent freely pivotable or rotatable about an axis of rotation that is in a fixed position with respect to the endless carriers, and in particular the stationary screening bars. In order to avoid undesired flapping down of the flap units that are freely pivotable between stationary screening bars in the region of deflections, it is possible, precisely in these regions, to provide one or more guide units, which, in addition to the positioning means and in particular as seen in a transverse direction, are arranged outside the region delimited by the endless carrier. Preferably, these are already known haulm feed-in rollers, which, in the relevant region located at the front in the direction of travel, prevent any flap units that pivot on account of centrifugal force from flapping down in an undesired manner.

Preferably, a guide surface of the positioning means and an outer surface, provided for resting thereon, or a flap unit are formed in a parallel manner, in order to bring about good guidance and a cleaning action on regions of the positioning means that are soiled by extraneous material during operation.

The object set at the beginning is likewise achieved by a flap unit, which comprises a screening bar and has at least one joint part configured to be fixed releasably to a further screening bar of a screening belt unit as described above or below, wherein the joint part or the screening bar of the flap unit has an outer surface configured to rest on a positioning means. The joint part can be part of a film hinge or of a pivot joint. While the positioning means has preferably an outer surface, provided with a plastics coating, and a guide surface, the flap unit can to this end advantageously have a surface that is formed parallel thereto in the different resting positions and ensures guidance that is as good as possible. Furthermore, the widths of the guide surface are advantageously coordinated with the width of the supporting surfaces of the flap unit such that they differ in width only by a few centimetres (<10 centimetres). In this way, only little extraneous material can be deposited on the guide surfaces of a positioning means and the guide surfaces are at the same time cleaned by the circumferentially resting outer surfaces of the flap unit in the upper strand during operation.

Advantageously, the joint part is configured in at least two parts and to receive the further screening bar of the screening belt unit, such that it is readily possible to exchange individual damaged or worn flap units. In particular, the joint part is then part of a rotary joint. Preferably, a sliding and/or latching element is provided for pivotably fixing the joint part in particular to a screening bar connected fixedly to an endless carrier, such that a flap unit is fastened and removed as quickly and easily as possible.

The joint parts present for mounting on a screening bar are preferably in the form of joint housings and can either be provided integrally with the transverse or screening bar that is positionable in a variable position or have corresponding receiving regions for conventional screening bars.

Finally, the object set at the beginning is also achieved by a screening belt having at least two endless carriers, preferably in the form of carrier belts or chains, between which screening bars are arranged in a direction transversely to the conveying direction, wherein a plurality of the flap units as described above or below are provided. In particular, such a screening belt, to which the respective advantages described above and below are likewise ascribed, is formed entirely by screening bar units comprising a corresponding flap unit.

Finally, the object is likewise also achieved by a harvesting machine comprising a screening belt unit as described above or below. This machine is ascribed the advantages of the screening belt unit that are described above and below. It goes without saying that this harvesting machine has the means that are necessary for operation of the screening belt unit according to the invention, for example guide rollers or pulleys, drive means, frames, or other supporting parts. In particular, the positioning means is fixed to the frame and can act on the movable screening bars via at least one correspondingly supported adjusting member.

According to a development according to the invention, the harvesting machine has a sensor for identifying the inclination of the ground and an associated evaluation and control device, wherein the harvesting machine is configured to use its evaluation device to control the positioning means depending on the ground inclination, in particular as seen in each case in the direction of travel. The more steeply it goes for example downhill, the larger the pockets that can be formed by the setting of the positioning means by the successive screening belt units. These pockets that arise as a result of the downward flapping in particular in the rising regions of a screening belt then counteract any rolling away, caused by gravity, of the harvested material transported on the screening belt. Sensors that can be used for identifying the ground inclination are in particular inclination sensors. The ground inclination can additionally or alternatively be determined via one or more other sensors, for example using a GPS or similar position sensor in conjunction with a ground map stored locally in the control and evaluation device or externally on a server. The control and evaluation device comprises conventional computer means that are used in harvesting machines. It is preferably integrated into the machine controller.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 11 shows the subject matter according to FIG. 9 in a further operating position.

DETAILED DESCRIPTION OF THE DRAWINGS

Individual technical features of the exemplary embodiments described below can also be combined to form subject matter according to the invention in combination with above-described exemplary embodiments and the features of the independent claims and any further claims. Where appropriate, elements that are functionally equivalent at least in parts are provided with identical reference signs.

Figure 1:
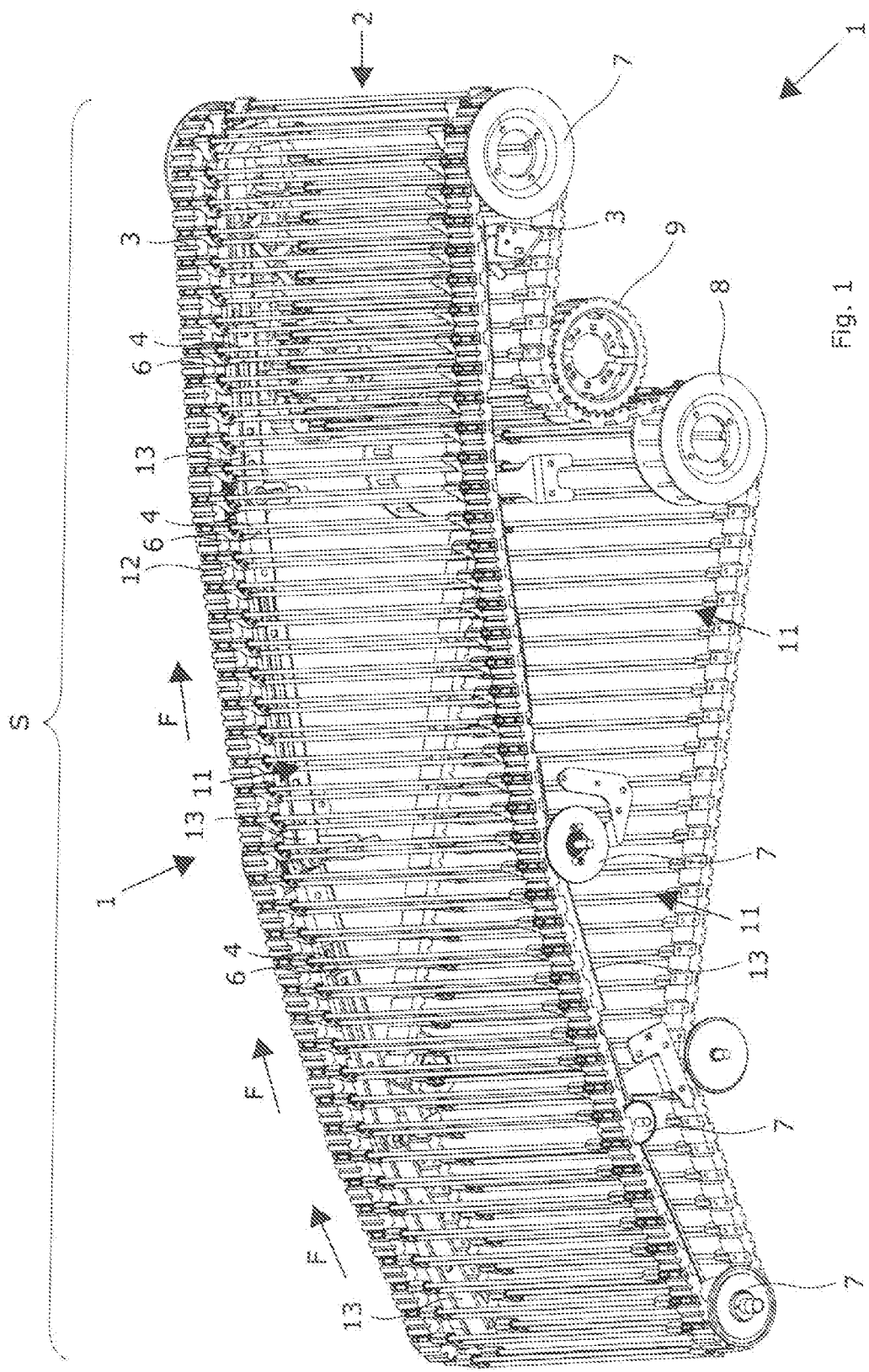
FIG. 1 shows subject matter according to an example embodiment of the invention in a perspective illustration.

A screening belt unit 1 according to the invention comprises, according to FIG. 1, a screening belt 2, which is provided to screen extraneous material out of a mixture of harvested material and extraneous material. The screening belt 2 has two endless carriers 3, in the form of carrier belts, between which screening bars 4 and 6 are arranged in a direction transversely to the conveying direction. With respect to a horizontal that is not indicated, the conveying direction F has different pitches over the course of a screening zone S formed by the upper strand of the screening belt 2. These pitches result from the positioning of deflection rollers or pulleys 7, which may partially be in the form of drive pulleys. A tension roller 8 tensions the screening belt 2 against a drive pulley 9, such that, depending on the set pitch of the screening belt, there is sufficient contact with the drive roller 9 in the individual screening belt zones.

Individual screening bars 4 and 6, which will be described in more detail below, form screening bar units 11 (cf. FIG. 6), which have a screening bar 4 fixed to the screening belt 2 and a screening bar 6, fixed thereto in an articulated manner, including an associated joint part 12.

The screening bars 6 are fixed in a movable manner relative to the endless carriers 3 via the rotary or pivot joints formed between and by the screening bars 4. Along the screening belt 2, a plurality of positioning means 13 are arranged both on the left-hand side in the conveying direction and on the right-hand side in the conveying direction, said positioning means 13 acting on the movable screening bars 6 in such a way that, in the screening zone, a spacing A (cf. FIGS. 9 to 11) as seen in the screening direction R is defined and settable in a variable manner by adjusting members. In particular, the spacing A can vary along the screening zone length in the conveying direction F.

Figure 2:
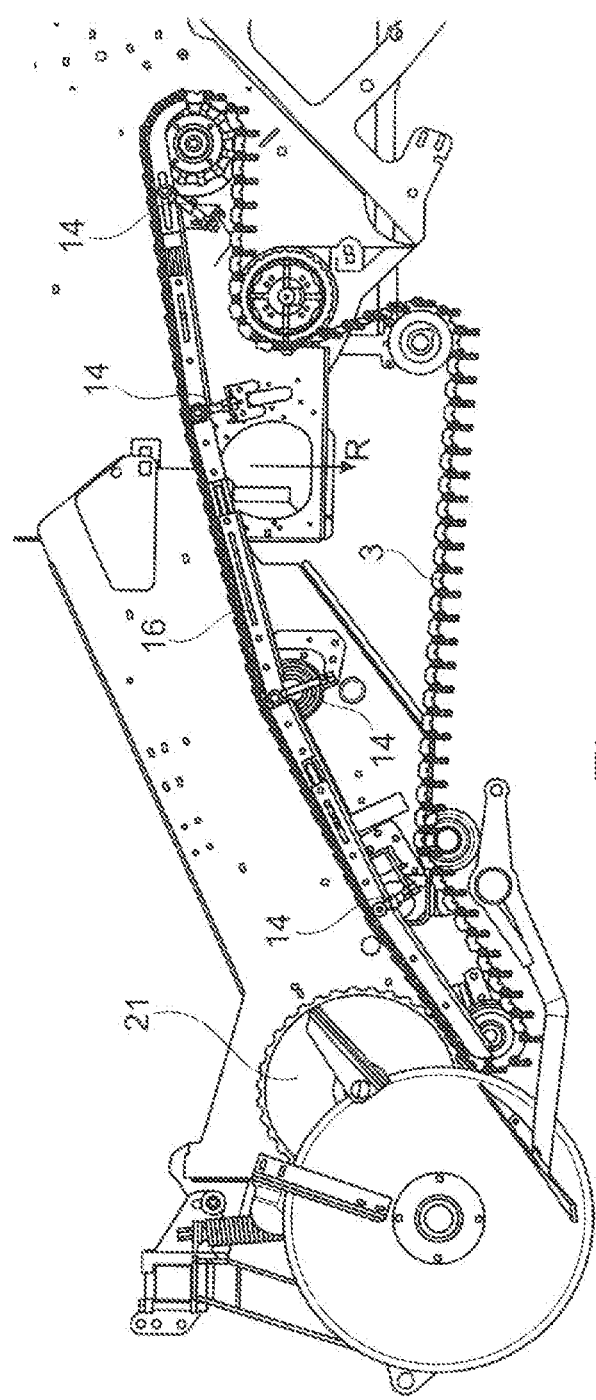
FIG. 2 shows a partial view of further subject matter according to an example embodiment of the invention in a side illustration.
Figure 3:
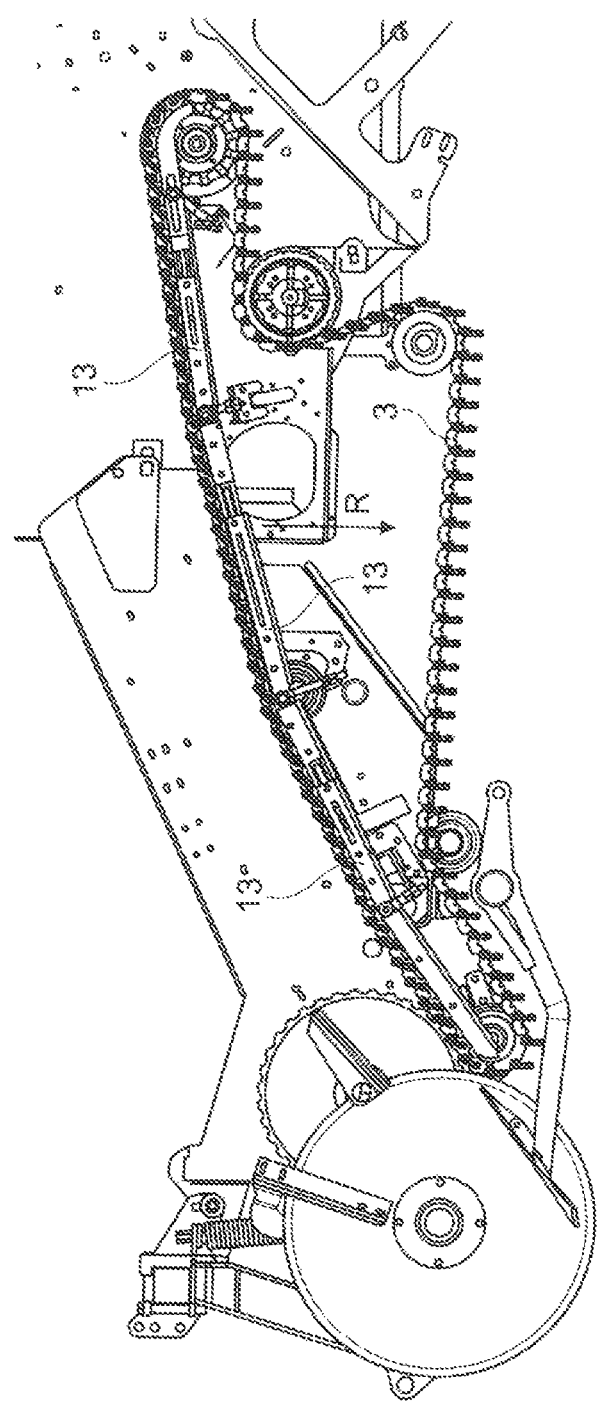
FIG. 3 shows the subject matter according to FIG. 2 in a further operating position.
Figure 4:
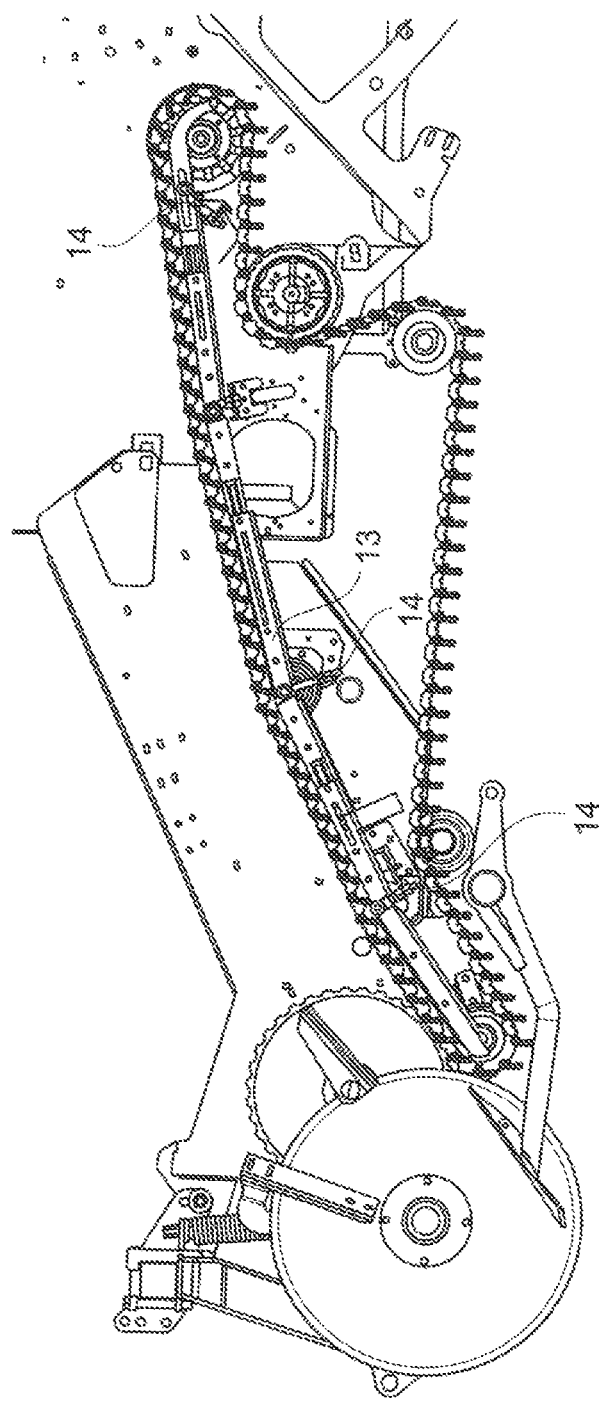
FIG. 4 shows the subject matter according to FIG. 2 in a further operating position.

The positioning means 13 is configured as a guide rail and in a multipart manner, such that, analogously to the individual pitch portions of the screening belt 2, individual portions of guide rails 13 result. With a plurality of associated adjusting members 14 (FIG. 2), the individual portions or parts of the positioning element 13 are able to be moved into the desired relative position with respect to the endless carrier 3. In order, in the case of different pitches of the screening belt in the course of the screening zone S, to be able to make the necessary adaptations, the multipart positioning element 13 is provided with a series of sliding connections that are movable by means of slots. The individual parts of the positioning element are thus guided one inside another and can as a result be moved towards and away from one another, in order for it to be possible to design the overall length of the positioning element 13 in the upper strand and the corresponding screening zone S in a variable manner. In FIGS. 2 to 4, conventional parts of a harvesting machine according to the invention are furthermore apparent.

FIGS. 2, 3 and 4 and 9, 10 and 11 illustrate the different screening belt parts and spacings A on account of different relative positions of the positioning element 13 or of parts of the positioning element 13 with respect to the endless carrier 3. As a result of the spacing apart of the positioning elements 13, arranged at least partially between the endless carriers 3 in plan view, from the endless carrier 3, the individual flap units of the screening bar units can take up a different angular position relative to the longitudinal extent of the endless carrier 3 or to the respective conveying direction. As a result, the spacing A of mutually successive screening bars 4, 6 of different screening bar units changes.

Figure 5:
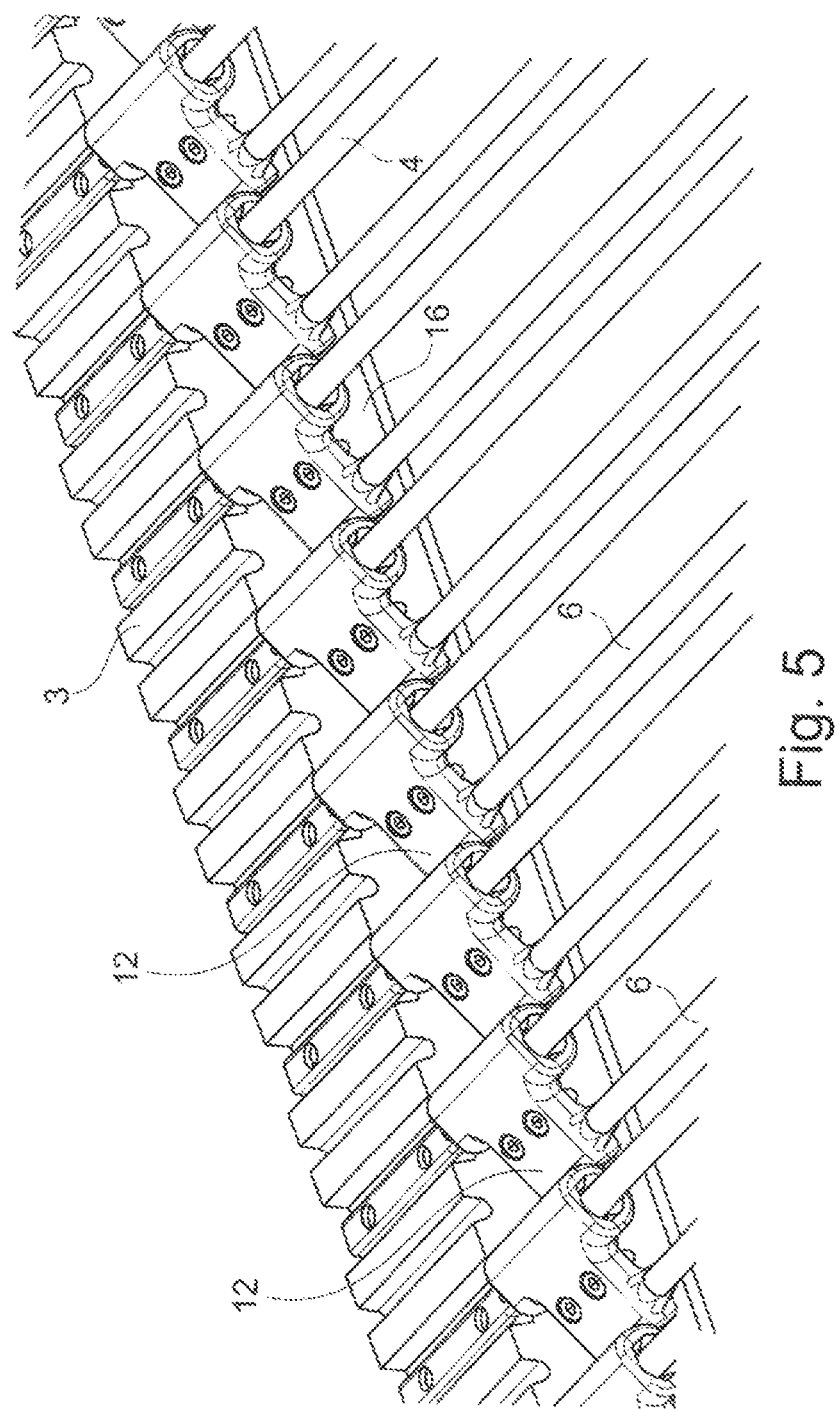
FIG. 5 shows the subject matter according to FIG. 3 in a detail illustration.

The positioning means 13 arranged to the left and right on the inside of the endless carriers 3 along the screening belt 2 limit the gravity-related pivoting or rotation of the movable parts of the screening bar units 11 or of the flap units until the opening, as described above, is at a maximum, when the screening belt 2 is extending horizontally, on account of a lack of contact with the support (FIG. 11). In order to limit the gravity-related pivoting or rotation of the flap units, the positioning means 13 is provided in the screening zone with a guide surface 16, on which, in the illustration in FIG. 5, the undersides (not shown in more detail) of the joint parts 12 of the flap units, comprising screening bars 6 and the joint part 12, rest. In order to reduce friction with the undersides of the flap units, the surface 16 is provided with a plastics coating. During operation of the screening belt unit according to the invention, as a result of the flap units running or sliding along the guide surface, the latter is cleaned of extraneous material dropping down from the upper strand.

Figure 7:
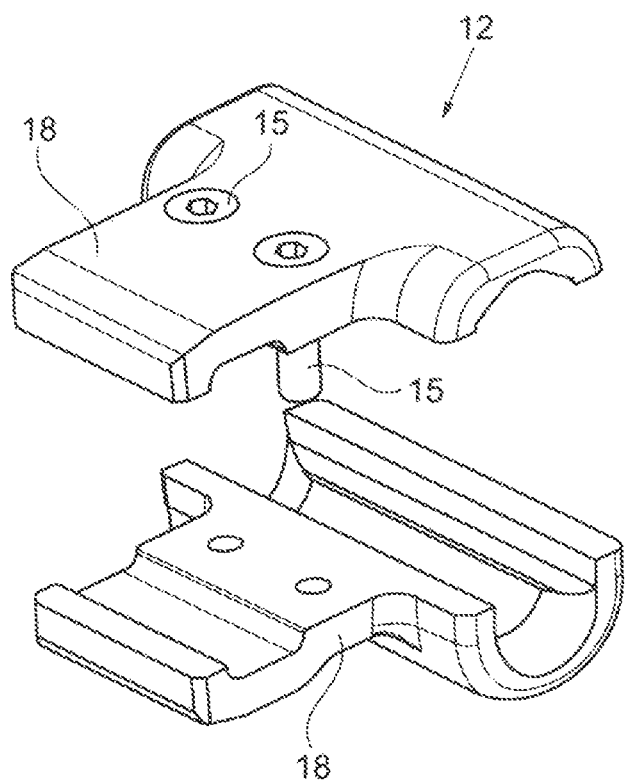
FIG. 7 shows a further detail of a device according to an example embodiment of the invention.
Figure 8:
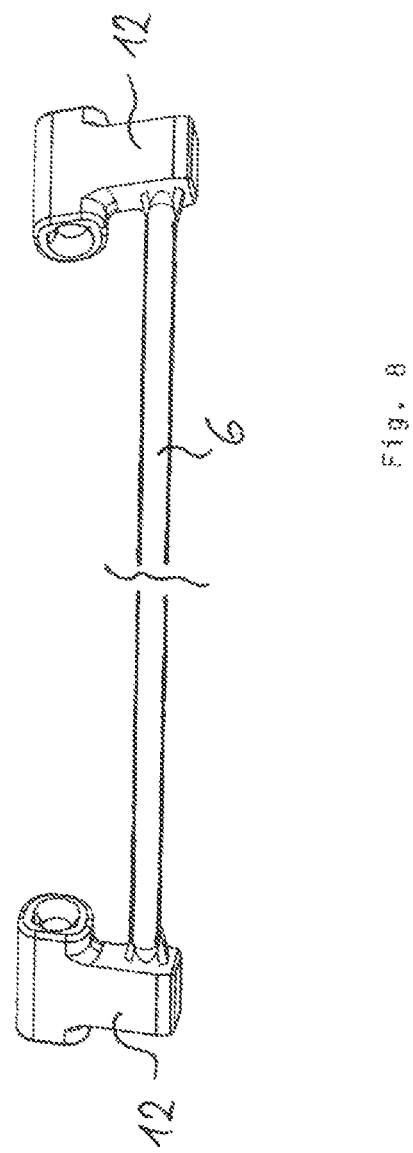
FIG. 8 shows further subject matter according to an example embodiment of the invention in a broken, slightly perspective illustration.

The flap units according to the invention can, according to FIG. 8, have at both ends joint parts 12, which are connected by the screening bar 6, illustrated in a broken manner. The screening bars 4 of a respective screening bar unit 11 are fixed to the endless carrier, such that, via the joint formed between the screening bar 4 and the screening bar 6, the screening bar 6 is fixed to the endless carrier 3 in a variable position (cf. FIGS. 5 and 6). For maintenance purposes, a joint part 12 is formed preferably with two housing halves 18 (FIG. 7), which are connected together via fastening means 15. A defective or damaged or worn flap unit can be replaced accordingly quickly.

Figure 9:
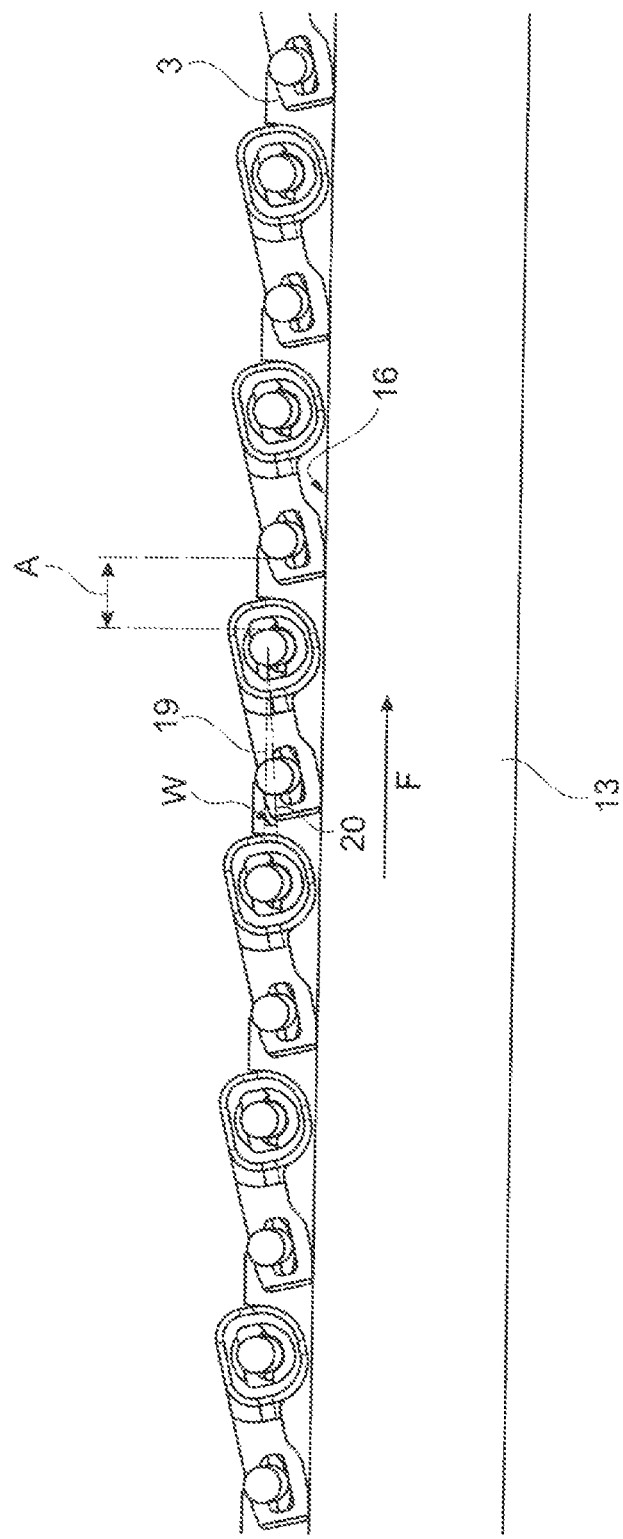
FIG. 9 shows a detail view of further subject matter according to an example embodiment of the invention.
Figure 10:
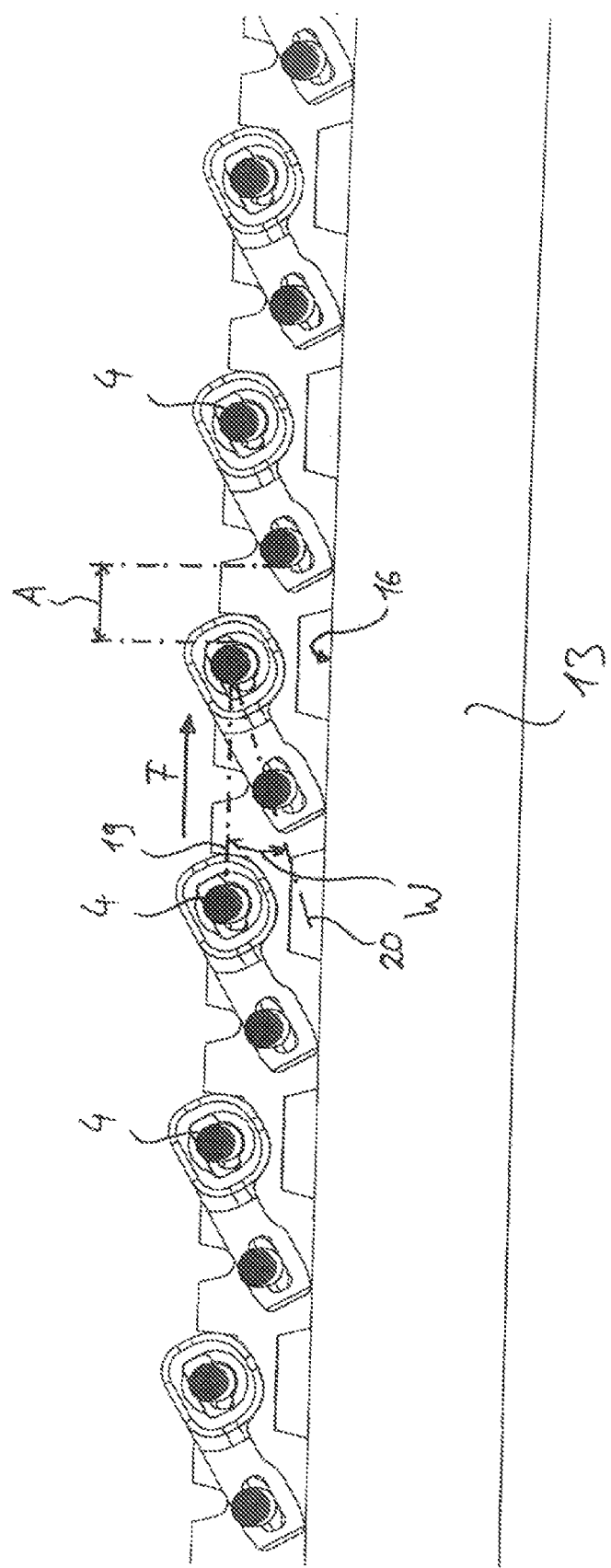
FIG. 10 shows the subject matter according to FIG. 9 in a further operating position.

The angular position of the flap unit or of the screening bar unit is, as shown in FIGS. 9, 10 and 11, limited in the screening zone S by the spacing of the positioning means 13 and in particular the guide surface 16 thereof from the screening belt carrier 3. In the maximally close position according to FIG. 9, an angle W between a straight line 19 formed parallel to the conveying direction F and thus to the endless carrier 3, and a straight line 20 formed by the longitudinal extent of a flap unit is virtually 0 (FIG. 9). As a result of the spacing apart of the positioning means 13 from the endless carrier or the axis of rotation of the stationary screening bars 4, the flap units can flap open under gravity and optionally loaded by mixture to be screened to a larger angle W and continue to rest on the guide surface 16 (FIG. 10). The greater spacing apart of the positioning means 13 from the axis of rotation of the respective stationary screening bar of a respective flap unit has the result, in the horizontal orientation, illustrated in FIG. 11, of the screening belt 2, that the joint parts 12 no longer rest on the guide surface 16 and the flap parts are pivoted open to a maximum. Depending on the symmetry of the flap unit, the angle W taken up for this is virtually 90°, but at least preferably between 80° and 100°. In order to avoid gravity-related overturning of the flap units in the region of the deflection of the endless carriers 3 or of the screening belt 2, a roller that is conventionally used as a guide unit 21 in the form of a haulm feed-in roller and is formed preferably in a wider manner than the endless carrier may be present in the deflection region (FIG. 2).

Figure 6:
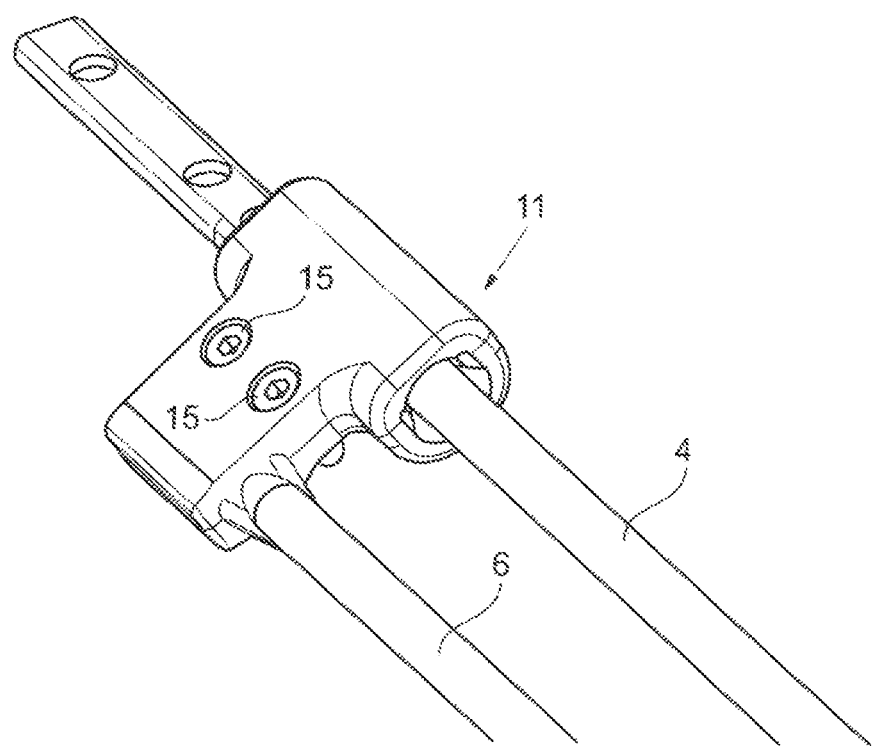
FIG. 6 shows a detail of a device according to an example embodiment of the invention.
Figure 12A:
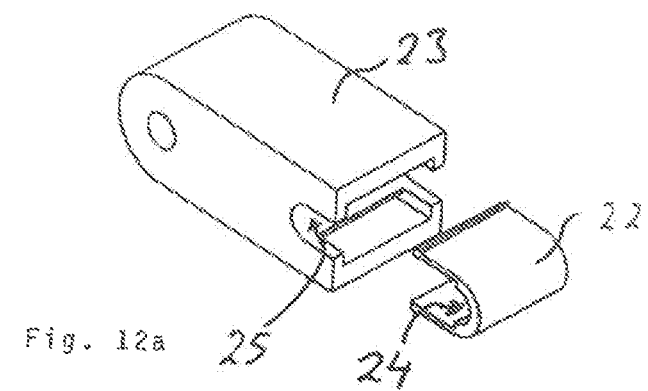
FIGS. 12a-c show views of a part of further subject matter according to an example embodiment of the invention.
Figure 12B:
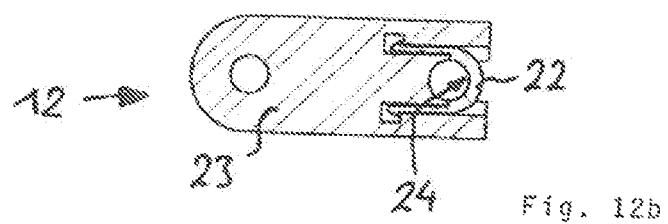
Figure 12C:
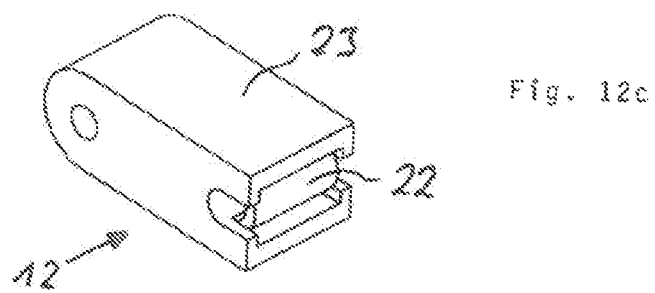
Figure 13A:
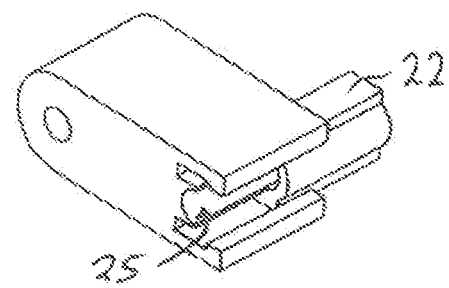
FIGS. 13a-c show views of a part of further subject matter according to an example embodiment of the invention.

A flap unit according to the invention that is an alternative to the flap unit according to FIG. 6 has a joint part 12, which, in order to pivotably fix the joint part in particular to a screening bar connected fixedly to an endless carrier, has a sliding and/or latching element 22, via which the fastening and removal of a flap unit takes place as quickly and easily as possible (FIGS. 12*a-c*). Rather than the screw connections of the joint part 12 according to FIG. 6, this joint part, and also the joint part according to FIGS. 13*a-c*, is provided with a latching and/or sliding element, which is introduced into a main part 23 of the joint part either at the end (FIG. 12*a*) or at the side (FIG. 13*a*) and is latched (FIG. 12*b*) or secured (FIG. 13*b*) there via undercuts 24.

The respective latching and/or sliding element 22 is made preferably of a harder material than the rest of the joint part 12 in the region of contact with a screening bar, such that the latching and/or sliding element 22 takes up the main forces that act on the flap unit and transfers them to the generally stationary screening bar, on which the flap unit is arranged.

Figure 13B:
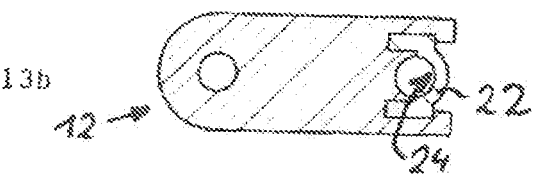
Figure 13C:
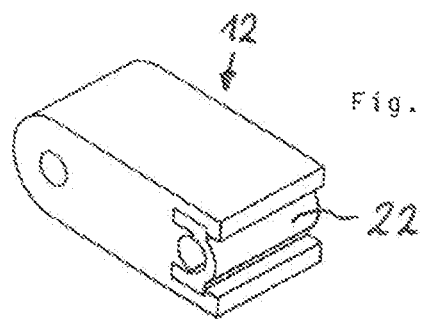

The latching and/or sliding element 22 forms, for the preferably stationary screening bar, together with the rest of the joint part 12, a cross-sectionally round bearing seat, which can be seen in FIG. 12*b* and FIG. 13*b*. For this purpose, the latching and/or sliding elements 22 of the exemplary embodiments in FIGS. 12 and 13 are provided with a cross-sectionally half-shell-shaped receptacle 24, the inner surface of which jointly forms, with a correspondingly shaped receptacle 25 of the main part 23, the bearing seat for the respective screening bar.

Figure 14:
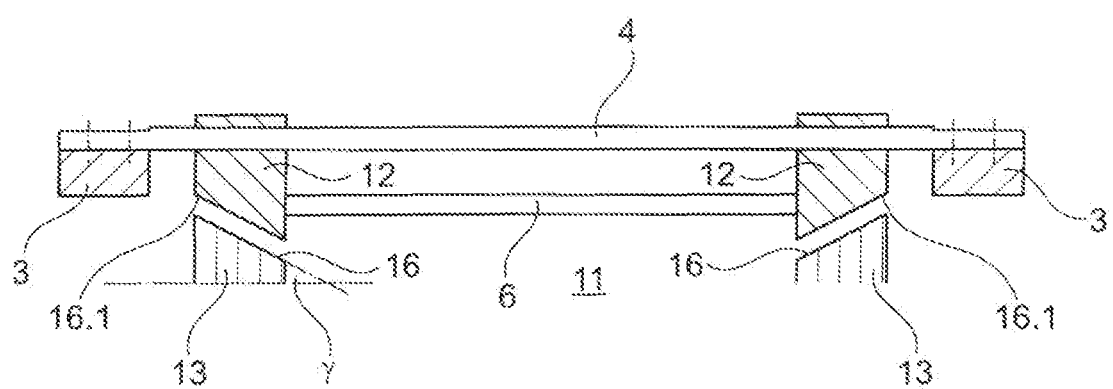
FIG. 14 shows a cross section through a further exemplary embodiment according to the invention.

In a further exemplary embodiment according to the invention of a screening belt unit, the latter is provided with two guide surfaces 16, which, in the cross section in FIG. 14 and as seen in the conveying direction, are angled at an angle γ to an underlying surface and configured in a manner dropping towards the middle M of the screening belt unit. As a result, less undesired extraneous material in the form of earth or clods can be deposited on the guide surfaces, and at the same time the flap unit is centred on the outer surface of the joint parts 12 by way of the correspondingly adapted joint part guide surfaces 16.1 and by way of joint part guide surfaces 16.1 that are positioned in an inclined manner in a complementary manner.

The invention claimed is:

1. A screening belt unit for a harvesting machine for screening extraneous material out of a mixture of harvested material and extraneous material, the screening belt unit comprising:
   a screening belt having at least two endless carriers;
   screening bars arranged between the at least two endless carriers in a direction transversely to the conveying direction, said screening bars forming a plurality of screening bar units that include at least two screening bars,
   wherein at least a part of at least one of the screening bars is fixed so as to be movable relative to the endless carriers,
   wherein the screening belt unit has a positioning means arranged at least partially along the screening belt, the positioning means acting on the movable screening bars and via which, in the screening zone S as seen in the screening direction, a spacing A in the conveying direction F of successive screening bars is defined in a variable manner; and
   wherein at least one adjusting member is assigned to the positioning means, via which the spacing of at least one part, guiding a flap unit, of the positioning means with respect to the endless carrier is settable.

2. The screening belt unit according to claim 1, wherein at least a part of the screening bar unit is designed to be variable in position relative to the endless carrier by the positioning means.

3. The screening belt unit according to claim 1, wherein the screening bar unit has a screening bar that is rotatable about an axis that is off-center from a longitudinal axis of the said screening bar.

4. The screening belt unit according to claim 1, wherein each screening bar unit has at least one said flap unit having at least one of the two screening bars wherein the flap unit is pivotable or rotatable via at least one joint connected to the endless carrier, and wherein the positioning means is configured to influence an angular position of the flap unit.

5. The screening belt unit according to claim 4, wherein the positioning means is configured to limit in particular gravity-related pivoting or rotation of the flap units.

6. The screening belt unit according to claim 4, wherein the positioning means has, in the screening zone S, at least one guide surface for the flap units to rest on.

7. The screening belt unit according to claim 6, wherein the guide surface, as seen in the conveying direction, is angled with respect to an underlying surface and is configured in a manner dropping in particular towards the middle (M) of the screening belt unit.

8. The screening belt unit according to claim 6, wherein the guide surface, as seen perpendicularly to the conveying direction, is arranged next to and in particular between the endless carriers.

9. The screening belt unit according to claim 6, wherein the guide surface, in order to create a selectively variable spacing A, is provided with a profiling.

10. The screening belt unit according to claim 1, wherein the positioning means is configured in a multipart manner in the screening zone.

11. The screening belt unit according to claim 1, wherein the screening bars of a screening bar unit are at an at least substantially fixed spacing from one another.

12. The screening belt unit according to claim 4, wherein one screening bar of each screening bar unit is fixed to the endless carriers and forms a part of two joints for the attachment of the flap unit.

13. The screening belt unit according to claim 1, wherein the positioning means is configured in a concurrently running manner.

14. The screening belt unit according to claim 1, wherein at least 25% of the screening bars are configured to be variable in position relative to the endless carrier.

15. The screening belt unit according to claim 1, further including a guide unit that limits the variation in position in particular on account of centrifugal force.

16. A flap unit for use on the screening belt of claim 1, the flap unit comprising:
    at least one joint part configured to be fixed releasably to a first screening bar secured to the screening belt, and a second screening bar supported by the joint part of the screening belt, wherein the joint part or the second screening bar has an outer surface configured to rest on a positioning means.

17. The flap unit according to claim 16, wherein the joint part is configured in at least two parts and to receive the further screening bar of the screening belt unit, wherein a sliding and/or latching element is provided for pivotably fixing the joint part.

18. A harvesting machine including, the screening belt unit of claim 1.

19. The harvesting machine according to claim 18, wherein the harvesting machine has a sensor for identifying the inclination of the ground and an associated evaluation and control device, wherein the harvesting machine is configured to use its evaluation device to control the positioning means depending on the ground inclination.

\* \* \* \* \*